United States Patent
Soga et al.

[11] Patent Number: 5,587,209
[45] Date of Patent: Dec. 24, 1996

[54] FLUOROCARBON-BASED POLYMER LAMINATION COATING FILM AND METHOD OF MANUFACTURING THE SAME

[75] Inventors: Mamoru Soga, Osaka; Norihisa Mino, Settsu; Kazufumi Ogawa, Hirakata; Yusuke Mochizuki, Neyagawa; Tsuneo Shibata, Kawanishi, all of Japan

[73] Assignee: Matsushita Electric Industrial Co., Ltd., Osaka, Japan

[21] Appl. No.: 438,875

[22] Filed: May 10, 1995

Related U.S. Application Data

[63] Continuation of Ser. No. 278,126, Jul. 21, 1994, abandoned, which is a continuation of Ser. No. 61,284, May 14, 1993, abandoned, which is a division of Ser. No. 786,824, Nov. 1, 1991, Pat. No. 5,238,746.

[30] Foreign Application Priority Data

Nov. 6, 1990 [JP] Japan ................................ 2-302021

[51] Int. Cl.$^6$ ........................................................ B05D 3/06
[52] U.S. Cl. ........................ 427/503; 427/536; 427/539; 427/407.2; 427/409; 427/412.1
[58] Field of Search ...................... 428/448; 427/407.2, 427/409, 412.1, 419.1, 419.7, 419.8, 535, 536, 537, 539, 503

[56] References Cited

U.S. PATENT DOCUMENTS 4,761,316  8/1988  Ogawa ........................................ 428/64
4,992,300  2/1991  Ogawa et al. ............................. 427/44

*Primary Examiner*—Shrive Beck
*Assistant Examiner*—Erma Cameron
*Attorney, Agent, or Firm*—Fish & Richardson PC

[57] ABSTRACT

The invention seeks to provide a substrate such as metal, ceramic, plastic, and glass material having a fluorine-based coating film having strong adhesion to a surface of the substrate. The substrate material comprises a monomolecular or polymer adsorption film formed on a base substrate surface and having siloxane bonds and a fluorine-based coating film provided on the adsorption film. The invention also seeks to provide a method of manufacturing a substrate material having a fluorine coating, which is simple and does not involve any electrolytic etching step. The method comprises a step of forming a monomolecular or polymer adsorbed film having —Si— bonds from dehydrochlorination or dealchoholation the bonded on the substrate surface and causing a silane-based surface active material, capable of reaction with an active hydrogen, to be brought in contact with the substrate surface, and laminating a fluorine-based polymer bonded by a cross-linking reaction process on the adsorbed film.

8 Claims, 1 Drawing Sheet

FLUOROCARBON-BASED POLYMER LAMINATION COATING FILM AND METHOD OF MANUFACTURING THE SAME

This application is a continuation of U.S. application Ser. No. 08/278,126, filed Jul. 21, 1994, now abandoned, which is a continuation of U.S. application Ser. No. 08/061,284, filed May 14, 1993, now abandoned, which is a divisional of U.S. application Ser. No. 07/786,824, filed Nov. 1, 1991, now U.S. Pat. No. 5,238,746.

FIELD OF THE PRESENT INVENTION

This invention relates to materials such as metals, ceramics, plastics, glass, etc. with a fluorine resin coating and, in particular, with a fluorine resin coating such as frying pans, pans and other cooking tools, copying rolls, stainless steel rolls, vessels, plates, etc. with a fluorine resin coating.

BACKGROUND OF THE INVENTION

Generally, a material with a fluorine resin coating is obtained by making the surface coarse by means of electrolytic etching or surface toughening for increased adhesion with a fluorine-based polymer. The surface is coated with a suspension of a fluorine-based polymer, followed by baking.

Obtained in this way, however, the surface and fluorine-based polymer coating are coupled together weakly for there are no chemical bonds between the two. Therefore, when the material is used for a long time, the adhesion deteriorates resulting in a separation of the fluorine-based coating from the surface of the material.

In addition, since the surface is electrolytically etched or toughened as a treatment for making it coarse, the manufacturing process is complicated, increasing the cost of manufacture.

Therefore, it has been requested that a material with a fluorine-based coating having excellent adhesion to the surface be developed. Furthermore, it has been requested that a method of manufacturing a material with a fluorine-based coating, which is simple and free from any electrolytic etching or surface toughening step be developed.

SUMMARY OF THE INVENTION

The primary objective of this invention is to provide a fluorocarbon-based polymer lamination coating film comprising at least an adsorbed film formed as an inner layer and a fluorocarbon-based polymer film formed as an outer layer on the surface of a substrate, the substrate surface and the inner layer are bonded with covalent bonds, and the inner layer and the outer layer are bonded with cross-linking bonds.

Another objective of this invention is to provide a method of manufacturing a fluorocarbon-based polymer lamination coating film comprising an adsorbed film having —Si— bonds from dehydrochlorination or dealchoholation bonded on the substrate surface and by causing a silane-based surface active material, capable of reaction with an active hydrogen, to be brought in contact with the substrate surface, and laminating a fluorine-based polymer, bonded by a cross-linking reaction process, on the adsorbed film.

It is preferable in this invention that the inner layer is a siloxane based monomolecular adsorbed film, and the substrate surface and the outer layer are bonded with covalent siloxane bonds.

It is preferable in this invention that the inner layer is a siloxane based polymer adsorbed film, and the substrate surface and the outer layer are bonded with covalent siloxane bonds.

It is preferable in this invention that the inner layer is at least one which is a reaction product of a silane-based surface material selected from the group consisting of alkyl silane halide, alkenyl silane halide, alkynyl silane halide, alkoxyl-based silane, and fluorine derivatives thereof.

It is preferable in this invention that the substrate is made of a member of a group consisting of metals, ceramics, plastics, and glass.

It is preferable in this invention that the silane-based surface material be selected from the group consisting of alkyl silane halide, alkenyl silane halide, alkynyl silane halide, alkoxyl-based silane, and fluorine derivatives thereof.

It is preferable in this invention that the adsorbed film be formed first on the surface of the substrate by bringing the substrate in contact with a non-aqueous organic solvent containing the silane-based surface active agent. The fluorine-based polymer film can then be formed on the adsorbed film by coating the fluorine-based polymer molecules onto the adsorbed film.

It is preferable in this invention that the fluorine-based polymer, bonded from a cross-linking reaction process, is irradiated, after the step of fluorine-based polymer coating film formation.

It is preferable in this invention that at least one of the silane-based surface active material or the fluorine-based polymer contains C=C and/or C≡C bonds.

It is preferable in this invention that the fluorine-based polymer is a solvent soluble type polymer.

It is preferable in this invention that the substrate is made of a plastic material treated in a plasma atmosphere containing oxygen.

DETAILED DESCRIPTION OF THE INVENTION

Figure 1:
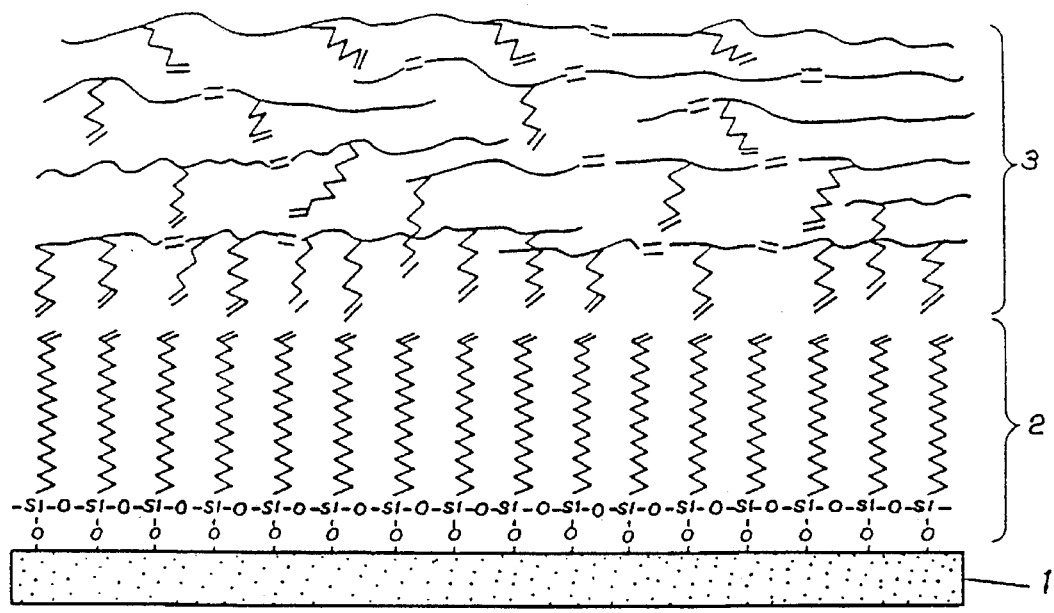
FIG. 1 is a fragmentary schematic side sectional view, enlarged in scale to the molecular level, showing a metal material according to this invention before irradiation.

Now, the invention will be described with reference to the drawings. As shown in FIG. 1, for instance, on the entire surface of a metal plate 1, a inner layer 2 having siloxane bonds is formed by causing an adsorption reaction of a silane-based surface active material having an ethylene group at a distal end of the molecule by a chemical adsorption process. The metal substrate 1, used according to the invention, may be of any metal material, e.g., aluminum, copper, iron, stainless steel, nickel, silver, platinum, gold and various alloys of these metals. In particular, a base metal material such as aluminum, copper or iron permits ready formation of a metal oxide layer on the surface and the oxygen in the metal oxide film reacts with silicon in the silane-based surface active material to form siloxane bonds.

Examples of the silane-based surface active material used according to the invention are chlorosilane-based compounds or alkoxylsilane-based compounds represented such as formula:

$(CH_3(CH_2)_n)_aSiCl_{4-a}$ (1)

$((CH_3)_3SiC\equiv C(CH_2)_n)_aSiCl_{4-a}$ (2)

$(CH_2=CH(CH_2)_n)_aSiCl_{4-a}$ (3)

$((CF_3)_3SiC\equiv C(CF_2))_aSiCl_{4-a}$ (4)

$(CF_2=CF(CF_2)_n)_aSiCl_{4-a}$ (5)

$(CH_2=CH\,(CF_2)_n-CH_2CH_2)_aSiCl_{4-a}$ (6)

$(CH_3(CH_2)_n)_aSi(OR)_{4-a}$ (7)

$((CH_3)_3SiC\equiv C(CH_2)_n)_aSi(OR)_{4-a}$ (8)

$(CH_2=CH(CH_2)_n)_aSi(OR)_{4-a}$ (9)

$((CF_3)_3SiC\equiv C(CF_2)_n)_aSi(OR)_{4-a}$ (10)

$(CF_2=CF(CF_2)_n)_aSi(OR)_{4-a}$ (11)

$(CH_2=CH(CF_2)_n-C_2H_4)_aSi(OR)_{4-a}$ (12)

(where n represents a natural number and integer, preferably 5 to 25, a represents an integer of 1 to 3, and R is a lower alkyl group, preferably $CH_3$ or $C_2H_5$.) Particularly preferable compounds are those based on trichlorosilane (where a in the above formula (1) to (6) is 1). This is because their molecules have a single hydrocarbon chain coupled to silicon and firmly bonded transversally by siloxane bonds, thus providing excellent mechanical strength.

As a method of adsorption of the silane-based surface active material, the silane-based surface active material is used by dissolving it in a non-aqueous solvent, e.g., hexadecane, cyclohexane and carbon tetrachloride. For example, it is necessary only to prepare a solution containing 80% wt of hexadecane, 12% wt of carbon tetrachloride and 8% wt of chloroform by dissolving the silane-based surface active material to a concentration of about $2\times10^{-3}$ to $5\times10^{-2}$ Mol/l and dipping a metal plate in the solution for one hour. The metal plate 1 has natural oxide formed on its surface, and the surface contains hydroxyl groups.

Thus, chlorosilyl groups of the silane-based surface active material and hydroxyl groups react to form bonds of on the surface, thus forming one monomolecular layer in a chemically bonded (covalent bond) form via oxygen atoms such as the formula [1].

$CH_2=CH(CH_2)_nSi(Cl)_3 + (-OH) \longrightarrow$ Formula [1]

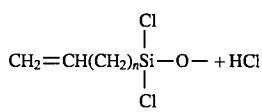

And then, the substrate was washed by non-aqueous solution, e.g., FREON®113 or chloroform to remove the material remaining on the surface without reaction, followed by washing by water or exposing in air to react with moisture in air, the —SiCl group changed to —SiOH group such as the formula [2]. A monomolecular adsorbed film was formed on the substrate.

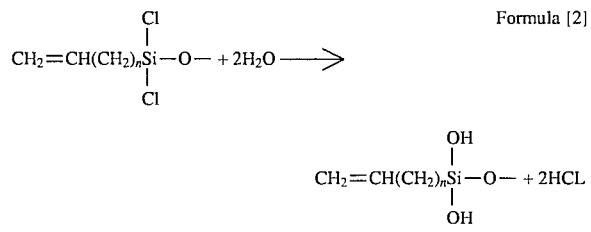

And then, each silanol group (—SiOH) caused to dehydrate reaction and crosslink by siloxane bond (—SiO—) such as the formula [3].

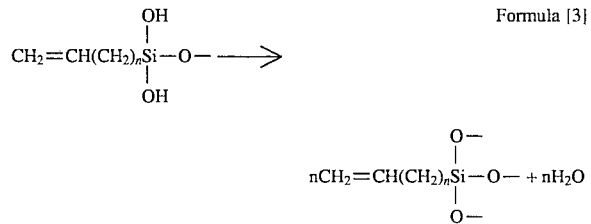

If the substrate was not washed by a non-aqueous solution, the inner layer was a polymer formed on the substrate.

By the consecutive reaction, a single adsorbed monomolecular film or polymer film (inner layer) was never separate in a checkerboard test. It is preferable in this invention that the inner layer is a siloxane based monomolecular adsorbed film. The single adsorbed monomoleuclar film was formed to a thickness of nanometer level such that it was chemically bonded (covalent bond) to a protective film via oxygen atoms.

Thus, alkoxysilane groups of the silane-based surface active material and hydroxyl groups react to form bonds of the formula [4]. Those reaction proceed substantially same as above formulas [1] to [3].

$CH_2=CH(CH_2)_nSi(OR)_3 + (-OH)\ldots \longrightarrow$ Formula [4]

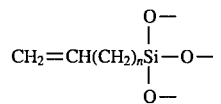

(wherein R is a lower alkyl group, preferably $CH_3$ or $C_2H_5$.)

Further, the concentration of hydroxyl groups contained on the surface may be increased to raise the adsorption efficiency by forming an oxide protective film with treatment of the metal surface with an aqueous alkali solution.

For the substrate having a surface containing hydroxyl groups according to the invention, metal and non-metal elements and ceramics may be used.

According to the invention, since hydrophilic groups formed on the substrate and chlorosilyl groups are reacted, where metals are used, base metals such as aluminum, copper and iron are suitable.

Further, a material without any oxide film such as plastic substrates are used after a surface treatment to render them hydrophilic. The surface treatment may be carried out by usual means such as a treatment in a plasma atmosphere containing oxygen at 100 W, for 20 minutes or a corona treatment. However, a surface oxygen treatment is not necessary for plastics containing —NH groups or —NH$_2$ groups, such as polyamide or polyurethane substrates. Because —NH or —NH$_2$ groups have active hydrogen, it is easy to cause the dehydrochloric acid reaction with chlorosilyl groups of the surface active material. Thus, alkoxysilane groups of the silane-based surface active material and imino groups (—NH) react to form bonds of the formula [5]. Those reaction proceed substantially same as above formulas [1] to [3].

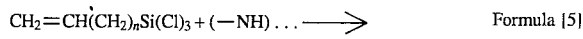   Formula [5]

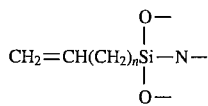

Subsequently, a solution or suspension of a fluorine-based polymer is coated on the inner layer 2, followed by drying and baking to form a fluorine-based coating film 3 such as shown in FIG. 1.

Since the fluorine-based coating film 3 is found on the inner layer 2 having siloxane bonds, the main chains are entangled at the interface with the hydrocarbon group component of the inner layer 2.

Examples of the fluorine-based polymer molecule constituting the fluorine-based coating film 3 are copolymers of denatured fluorine polystyrene, ethylene polyfluoride, vinylidene polyfluoride, polytetrafluoroethylene and tetrafluoroethylene with perfluoroalkylvinylether. Among these compounds, the greater the fluorine substitution becomes, the more superior the hydrophilic and oil-repelling properties are.

An example polymer has the following repetition unit:

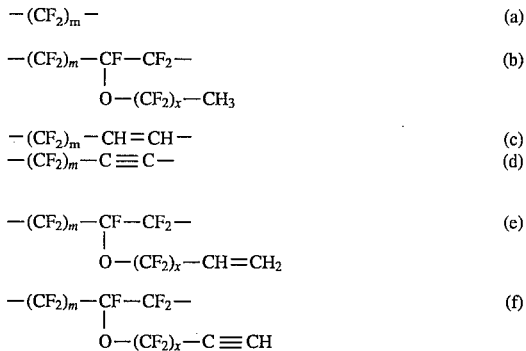

where m, and x represent integers, m is most preferably 5 to 500, x is preferably 1 to 10.

A polymer with less fluorine content (e.g., denatured fluorine polystyrene, ethylene polyfluoride and vinylidene polyfluoride) can be dissolved in a selected solvent, chosen so that the entangling of molecule chains can be increased.

Figure 2:
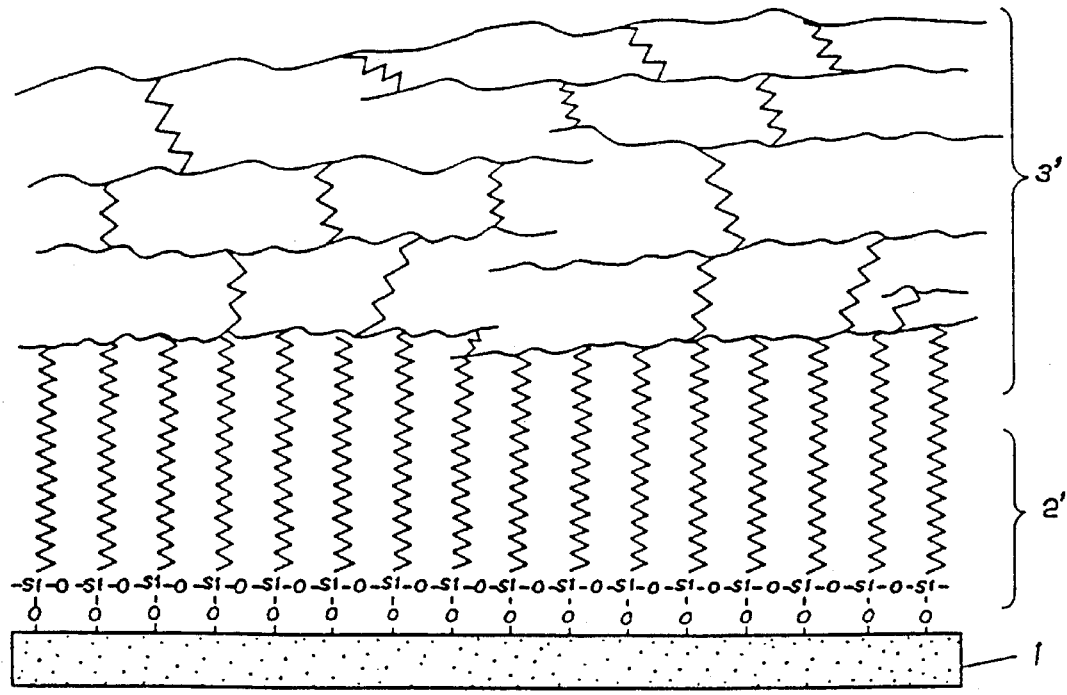
FIG. 2 is a fragmentary schematic side sectional view, enlarged in scale to the molecular level, showing the metal material according to this invention after the irradiation.

With a structure such as shown in FIG. 1, where the inner layer 2 contains unsaturated bonds such as C=C bonds and also the fluorine-based coating film 3 contains unsaturated bonds such as C=C bonds, irradiation causes breakage of C=C bonds in the inner layer 2 having siloxane bonds and those in the fluorine-based coating film 3, such as shown in FIG. 2, thus forming chemical bonds between the inner layer 2' and fluorine-based coating film 3'.

In FIGS. 1 and 2, unsaturated C=C bonds are contained in the inner layer 2 and fluorine-based coating film 3. The unsaturated bond may be a triple bond such as a C≡C bond as well as a double bond such as C=C bond.

For efficient cross-linking with the inner layer 2' with irradiation, however, a fluorine-based polymer containing C=C or C≡C bonds in the main or side chain as shown in FIG. 2 is preferred so that an increased mechanical strength can be obtained.

The following may be used as the radiation for irradiation of the fluorine-based coating film 3; an electron beam, a corona treatment, a neutron beam, alpha rays, beta rays and gamma rays.

With this structure, it is most preferable that the monomolecular film is chemically bonded via the siloxane bonds to the metal plate and the fluorine-based polymer coating film. For this reason, it is possible to obtain a metal material with a fluorine-based polymer coating, which is never separated even after long use of the material and has excellent adhesion compared to the prior art fluorine-based coating film, for which only the anchor effect has been expected.

With this method of manufacturing the material (e.g. metal), a monomolecular film of silane-based surface active material is formed on a metal plate by a chemical adsorption process, and a fluorine-based polymer is coated by a coating process on the monomolecular film. Thus, electrolytic etching or surface toughening step is unnecessary, and the method of manufacture is simplified.

The invention can widely be applied to the following uses. Materials made of metal, cersmic or plastic, glass, wood, stone, etc. are applicable to the substrate. The surface of the substrate can also be coated with paint or the like.

Examples of cutlery: a kitchen knife, scissors, a knife, a cutter, a graner, a razor, hair clippers, a saw, a plane, a chisel, a gimlet, a badkin, bite (cutting tools), the edge of a drill, the edge of a mixer and a juicer blade, a blade of a mill, a blade of a lawnmower, a punch, a straw cutter, a staple of a stapler, a can opener or a surgical knife and the like.

Examples of needles: an acupuncture needle, a sewing needle, a matting needle, an injection needle, a surgical needle, a safety pin and the like.

Examples of products in pottery (ceramics) industry: products made of pottery, glass, ceramics or an enameled products. For example, sanitary potteries (a chamber pot, a wash-bowl, a bathtub, etc.), tableware (a rice-bowl teacup, a dish (plate), a bowl, a teacup, a glass, a bottle, a coffee-pot (siphon), a pan, an earthenware mortar, a cup and the like), vases (a flower bowl, a flowerpot, a bud vase and the like), water tanks (a breeding cistern, an aquarium water tank and the like), chemical experiment appliances (a beaker, a reactor vessel, a test tube, a flask, a laboratory dish, condenser, a mixing rod, a stirrer, a mortar, a bat, a syringe, etc.) a roof tile, and enameled ware, an enameled washbowl, and enameled pan and the like.

Examples of molding parts: dies for press molding, dies for cast molding, dies for injection molding, dies for transfer molding, dies for compression molding, dies for transfer molding, dies for inflation molding, dies for vacuum molding, dies for blow forming, dies for extrusion molding, dies for fiber spinning, a calendar processing roll and the like.

Examples of forming molds for food: cake, cookies, bread-baking, chocolate, jelly, ice cream, an oven ware, an ice tray and the like.

Examples of cookware: kitchen utensils (a pan and a pot), a kettle, a pot, a frying-pan, a hot plate, a toasting net, a takoyaki plate and the like.

Examples of resin(s): a polyolefin such as a polypropylene and polyethylene, a polyvinylchloride plastic, a polyamide, a polyimide, a polyamideimide, a polyester, a aromatic polyester, a polycarbonate, a polystyrene, a polysulfide, a polysulfone, a polyethersulfone, a polyphenylenesulfide, a phenolic resin, a furan resin, a urea resin, a epoxy resin, a polyurethane, a silicon resin, an ABS resin, a methacrylic resin, an acrylate resin, a polyacetal, a polyphenylene oxide, a poly methylepentene, a melamine resin, a alkyd resin, a unsaturated polyester cured resin and the like.

Examples of rubber(s): a styrene-butadien rubber, a butyl rubber, a nitril rubber, a chloroprene rubber, a polyurethane rubber, a silicon rubber and the like.

Examples of household electrical appliances: a refrigerator of freezing machines, a freezer, an air conditioner, a juicer, a mixer, a blade of an electric fan, a lighting apparatus, a dial plate, a dryer(or drier) for perm and the like.

Examples of sports articles: skis, a pole vaulting pole, a boat, a yacht, a surfboard, a fishing rod, a float and the like.

Examples applying to vehicle parts:
(1) ABS resin: a lamp cover, an installment pannel, trimming parts, a protector for a motorcycle.
(2) Cellulose plastic: a car mark, a steering wheel
(3) FRP (fiber reinforced plastics): a bumper, an engine cover (jacket)
(4) Phenolic resin: a brake
(5) Polyacetal: wiper gear, a gas valve
(6) Polyamide: a radiator fan
(7) Polyarylate (polycondensation polymerization by bisphenol A and pseudo phtalic acid): a direction indicator lamp (or lense), a cowl board lense, a relay case
(8) Polybutylene terephthalate (PBT): a rear end, a front fender
(9) Poly(amino-bismaleimide): engine parts, a gear box, a wheel, a suspension drive system
(10) Methacrylate resin: a lamp cover lens, a meter pannel and its cover, center mark
(11) Polypropylene: a bumper
(12) Polyphenylene oxide: a radiator grille, a wheel cap
(13) polyurethane: a bumper, a fender, an installment pannel, a fan
(14) Unsaturated polyester resin: a body, a fuel tank, a heater housing, a meter pannel.

Examples of office supplies: a desk, a chair, a bookshelf, a rack, a telephone stand table, a rule (measure), a drawing instrument and the like.

Examples of building materials: materials for a roof, and outer wall and interiors. Roof materials such as brick, slate and tin (a galvanized iron sheet) and the like. Outer wall materials such as wood (including processed manufactured wood), mortar, concrete, ceramic sizing, metalic sizing, brick, stone, plastic and metal like a aluminum. Interior materials such as wood (including processed wood), metal like aluminum, plastic, paper, fiber and the like.

Examples of building stones: granite, marble and others for use as a building, a building material, an architecture, an ornament, a bath, a grave stone, a monument, a gatepost, a stone wall, a paving stone and the like.

Examples of a thermos bottle, a vacuum bottle, a vacuum vessel and the like.

Examples of a highly resisting voltage insulator such as a power supplying insulator or a spark plug, which have high hydrophobic, oilphobic and prevention of contamination properties.

Examples of the invention will now be given where aluminum is used as a metal material.

EXAMPLE 1

An aluminum plate (2×5×0.1 cm) was dipped in $10^{-2}$ mol/l ω-nonadecenyltrichlorosilane solution (containing 80% wt hexadecane, 12% wt carbon tetrachloride and 8% wt chloroform) at room temperature in an nitrogen atmosphere for 60 minutes, followed by washing with chloroform and then with water to obtain a monomolecular film formed on the aluminum surface.

On the surface of this aluminum plate was spray coated a suspension of polymer of the following repetition unit:

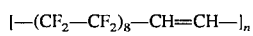

(where n is a natural number, preferably 5 to 500), followed by drying at 150° C. for 10 minutes and then baking at 380° C. for 20 minutes, thus forming a fluorine-based coating film with a thickness of 500 micrometers (μm).

A sample produced in the above way was irradiated with an electron beam of 300 keV and 0.02 Mrads/1 for one minute.

EXAMPLE 2

The same experiment as in Example 1 was conducted except that ω-nonadecenyltrichlorosilane was replaced with 19-trimethylsilyl-18-nonadecenyltrichlorosilane.

EXAMPLE 3

The same experiment as in Example 1 was conducted except that the fluorine-based polymer was replaced with repetition unit:

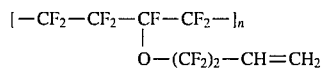

(where n is a natural number, preferably 5 to 500).

EXAMPLE 4

The same experiment as in Example 1 was conducted except that the fluorine-based polymer was replaced with

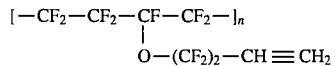

(where n is a natural number, preferably 5 to 500).

EXAMPLE 5

The same experiment as in Example 1 was conducted except that the fluorine-based polymer was replaced with a copolymer of tetrafluoroethylene and perfluoroalkylvinylether.

EXAMPLE 6

The same experiment as in Example 1 was conducted except that ω-nonadecenyltrichlorosilane and fluorine-based polymer were respectively replaced with nonadecenyltrichlorosilane and a copolymer of tetrafluoroethylene and perfluoroalkylvinylether.

EXAMPLE 7

The same experiment as in Example 1 was conducted except that ω-nonadecenyltrichlorosilane and fluorine-based polymer were respectively replaced with nonadecenyltrichlorosilane and a copolymer of tetrafluoroethylene and perfluoroalkylvinylether and the electron beam irradiation was dispensed with.

EXAMPLE 8

An aluminum plate (2×5×0.1 cm) was dipped in $10^{-2}$ mol/l ω-nonadecenyltrichlorosilane solution (containing 80% to wt hexadecane, 12% wt carbon tetrachloride and 8% wt chloroform) at room temperature in an nitrogen atmosphere for 60 minutes, followed reaction with water to obtain a polymer film (inner layer) formed on the aluminum surface.

On the surface of this aluminum plate was spray coated a suspension of polymer of the following repetition unit;

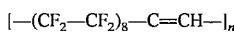
$[-(CF_2-CF_2)_8-C=CH-]_n$ (where n is a natural number, preferably 5 to 500), followed by drying at 150° C. for 10 minutes and then baking at 380° C. for 20 minutes, thus forming a fluorine-based coating film with a thickness of 500 micrometers (μm).

A sample produced in the above way was irradiated with an electron beam of 300 keV and 0.02 Mrads/1 for one minute.

Comparative Example 1

An aluminum plate (2×5×0.1 cm) was electrolytically etched and then spray coated with a suspension of polytetrafluoroethylene, followed by drying and baking under the same conditions as in Example 1 to form a fluorine-based coating film.

Peel tests were conducted on samples of Examples 1 to 8 and the Comparative example 1.

Table 1 shows results of peel (or adhesion) strength measurements conducted by setting the width of the fluorine-based coating film under test to 10 mm.

TABLE 1

| Sample | Peel (or adhesion) strength | |
|---|---|---|
| | (kg/10 mm) | (Newton/10 mm) |
| Example 1 | 15.0 | 147.0 |
| Example 2 | 17.0 | 166.6 |
| Example 3 | 20.0 | 196.0 |
| Example 4 | 21.0 | 205.8 |
| Example 5 | 14.0 | 137.2 |
| Example 6 | 12.0 | 117.6 |
| Example 7 | 10.0 | 98.0 |
| Example 8 | 14.0 | 137.2 |
| Comparative example 1 | 6.0 | 58.8 |

The peel (or adhesion) strength of the fluorine-based coating film production example and comparative example was measured as follows.
(1) A sample with a width of 30 mm and a length of 60 mm, and pre-adhesion of fluorine-based resin plate such as FEP (tetrafuoroethylene-hexafluoropropylene copolymer) resin plate at about 300° C.~350° C. by heat press roller.
(2) Main heat adhesion by electric furnance at 350° C. for 15 minutes.
(3) Cut the test piece with a width of 10 mm, and peel or adhesion) strength was measured by ordinary adhesion test apparatus.

As is seen from Table 1, all of the aluminum materials according to the invention had peel strengths of 10.0 kg/10 mm (98 Newton/10 mm) or above, indicating superiority in adhesion to that in the comparative example, in which the peel (or adhesion) strength was 6.0 kg/10 mm (58.8 Newton/10 mm).

While the above examples used aluminum plates, the same effects could be obtained with such metals as steel, stainless steel, iron, copper, nickel, Alumite, and zinc and also alloys of these metals.

As has been described in the foregoing, the metal plate according to the invention has a fluorine-based coating film bonded to its surface via siloxane bonds and has excellent adhesion compared to the prior art metal plate.

Further, there is no need of electrolytic etching as a treatment prior to the fluorine-based coating film formation. Thus, it is possible to simplify the manufacturing process and reduce manufacturing cost.

As has been shown, the invention is greatly beneficial to the industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A method of manufacturing a fluorocarbon-based polymer lamination coating film which comprises an inner layer comprising an adsorbed film, and an outer layer comprising a cross-linked fluorine-based polymer film wherein the inner layer is bonded onto a substrate surface with siloxane bonds, and said inner layer is bonded to said outer layer, comprising contacting a silane-based surface active material, capable of reaction with an active hydrogen, with the substrate surface to form the adsorbed film, and bonding the fluorine-based polymer by a cross-linking reaction process on the adsorbed film.

2. The method of manufacturing the fluorocarbon-based polymer lamination coating film according to claim 1, wherein the silane-based surface active material is selected from the group consisting of alkyl silane halide, alkenyl silane halide, alkynyl silane halide, alkoxyl-based silane, fluoroalkyl silane halide, fluoroalkenyl silane halide, fluoroalkynyl silane halide and fluoroalkoxyl-based silane.

3. The method of manufacturing the fluorocarbon-based polymer lamination coating film according to claim 1, wherein the adsorbed film is formed on the surface of the substrate by bringing the substrate in contact with a non-aqueous organic solvent containing the silane-based surface active material; and wherein the fluorine-based polymer film is then formed by coating fluorine-based polymer molecules onto the adsorbed film.

4. The method of manufacturing the fluorocarbon-based polymer lamination coating film according to claim 1, further comprising irradiating said fluorine-based polymer bonded by a cross-linking reaction process, after bonding the fluorine-based polymer on the adsorbed film.

5. The method of manufacturing the fluorocarbon-based polymer lamination coating film according to claim 1, wherein at least one of the silane-based surface active material and the fluorine-based polymer contains C=C and/or C≡C bonds.

6. The method of manufacturing the fluorocarbon-based polymer lamination coating film according to claim 1, wherein said fluorine-based polymer is a solvent soluble polymer.

7. The method of manufacturing the fluorocarbon-based polymer lamination coating film according to claim 1, wherein said substrate is made of a member selected from the group consisting of metals, ceramics, glass and plastics.

8. The method of manufacturing the fluorocarbon-based polymer lamination coating film according to claim 1, wherein said substrate is made of a plastic material treated in a plasma or corona atmosphere containing oxygen.

* * * * *